United States Patent
Saxton et al.

(10) Patent No.: US 9,694,828 B2
(45) Date of Patent: Jul. 4, 2017

(54) OPERATING MECHANISM FOR TANK CAR BOTTOM VALVE

(71) Applicant: Gunderson LLC, Portland, OR (US)

(72) Inventors: Gregory J. Saxton, Portland, OR (US); Bradley J. Thomas, Beaverton, OR (US); Brian J. Jurvakainen, Clatskanie, OR (US)

(73) Assignee: Gunderson LLC, Portland, OR (US)

( * ) Notice: Subject to any disclaimer, the term of this patent is extended or adjusted under 35 U.S.C. 154(b) by 90 days.

(21) Appl. No.: 14/720,361

(22) Filed: May 22, 2015

(65) Prior Publication Data

US 2015/0336590 A1    Nov. 26, 2015

Related U.S. Application Data

(60) Provisional application No. 62/002,658, filed on May 23, 2014.

(51) Int. Cl.
*B61D 5/00* (2006.01)
*F16K 35/02* (2006.01)

(52) U.S. Cl.
CPC .............. *B61D 5/008* (2013.01); *F16K 35/02* (2013.01); *F16K 35/025* (2013.01); *Y10T 137/6877* (2015.04)

(58) Field of Classification Search
CPC ....... F16K 35/02; F16K 35/025; B61D 5/008; B61D 5/002; B61D 5/004; B61D 7/02; B61D 7/04; Y10T 137/6877
USPC ..... 251/89, 110, 144; 137/384.2, 384.8, 385
See application file for complete search history.

(56) References Cited

U.S. PATENT DOCUMENTS

| 927,621 | A | * | 7/1909 | Williams | F16K 35/06 137/385 |
| 1,284,063 | A | * | 11/1918 | Davis et al. | F16K 1/482 137/585 |
| 1,399,608 | A | * | 12/1921 | Garrett | B61D 5/008 137/327 |
| 1,523,484 | A | * | 1/1925 | Lindstrom | B61D 5/008 137/553 |
| 1,667,525 | A | * | 4/1928 | Bashcongi | F16K 35/02 251/105 |
| 1,714,927 | A | * | 5/1929 | Shield | F16K 35/14 137/267 |
| 1,995,174 | A | * | 3/1935 | Gerrard | F01M 11/0408 184/1.5 |
| 2,045,758 | A | * | 6/1936 | Crossen, Jr. | F16K 31/52408 137/635 |
| 2,073,513 | A | * | 3/1937 | Dietrichson | B61D 7/26 105/248 |
| 3,930,634 | A | * | 1/1976 | Loveless | F16K 35/02 251/96 |
| 4,106,749 | A | * | 8/1978 | Behle | F16K 17/19 137/587 |

(Continued)

*Primary Examiner* — Mary McManmon
*Assistant Examiner* — Jonathan Waddy
(74) *Attorney, Agent, or Firm* — Chernoff Vilhauer McClung & Stenzel LLP

(57) ABSTRACT

An operating mechanism for a bottom valve for a cargo tank of a railroad tank car, in which a valve operating lever is normally disconnected from a valve operating shaft and a valve operating shaft assembly includes a weak-link connector to prevent inadvertent opening of the bottom valve in case of derailment of the tank car.

8 Claims, 16 Drawing Sheets

(56) References Cited

U.S. PATENT DOCUMENTS

| | | | | |
|---|---|---|---|---|
| 4,141,535 A | * | 2/1979 | Reedy | F16K 1/48 |
| | | | | 137/544 |
| 4,429,855 A | * | 2/1984 | Buffone | F16K 27/07 |
| | | | | 137/556 |
| 4,455,110 A | * | 6/1984 | Schipper | B61D 7/20 |
| | | | | 406/119 |
| 4,474,078 A | * | 10/1984 | Denkowski | F16K 31/05 |
| | | | | 192/35 |
| 2009/0309057 A1 | * | 12/2009 | Liccardi | F16K 31/055 |
| | | | | 251/249.5 |
| 2014/0261072 A1 | * | 9/2014 | Thompson | G05G 1/08 |
| | | | | 105/358 |

* cited by examiner

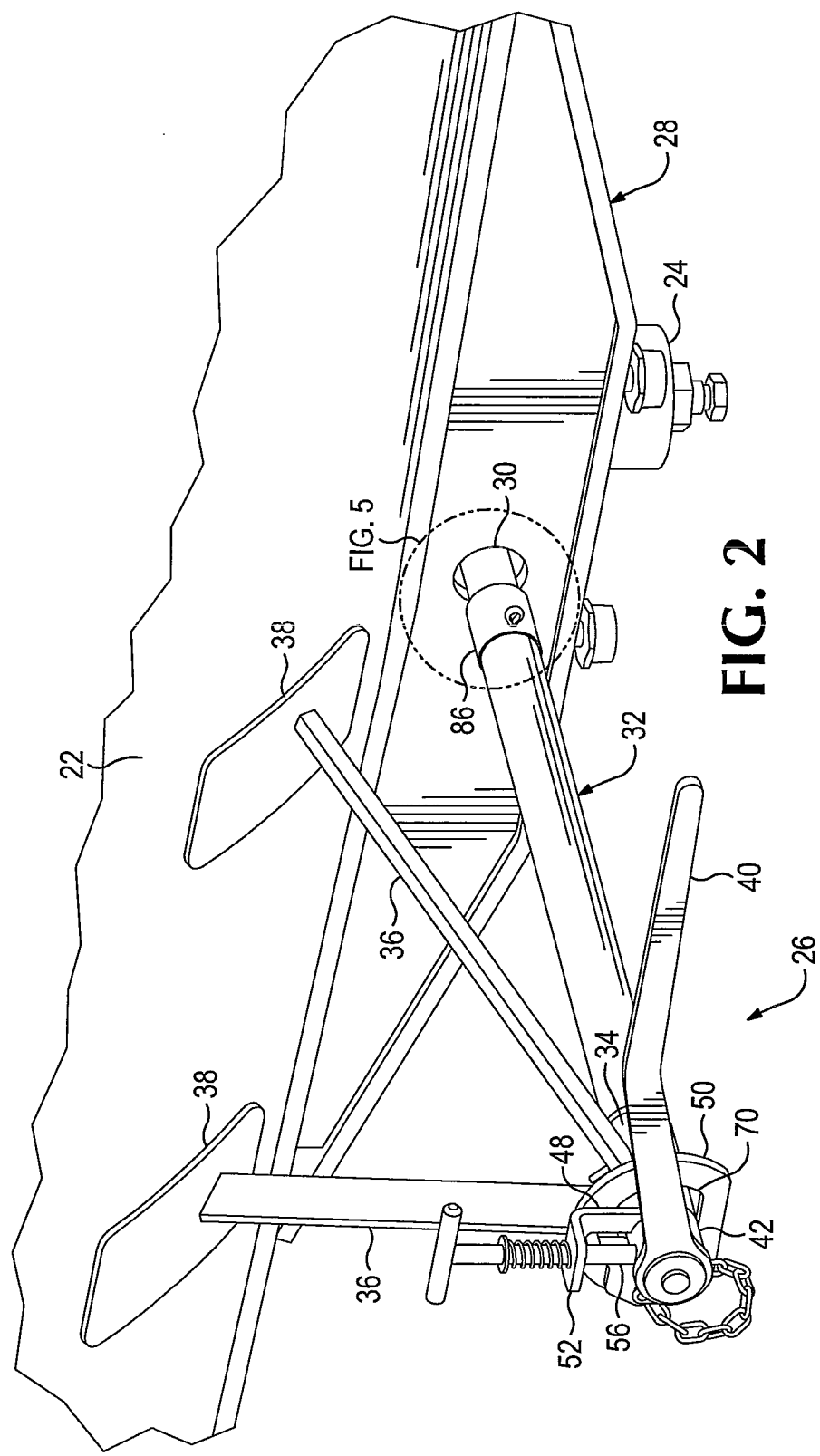

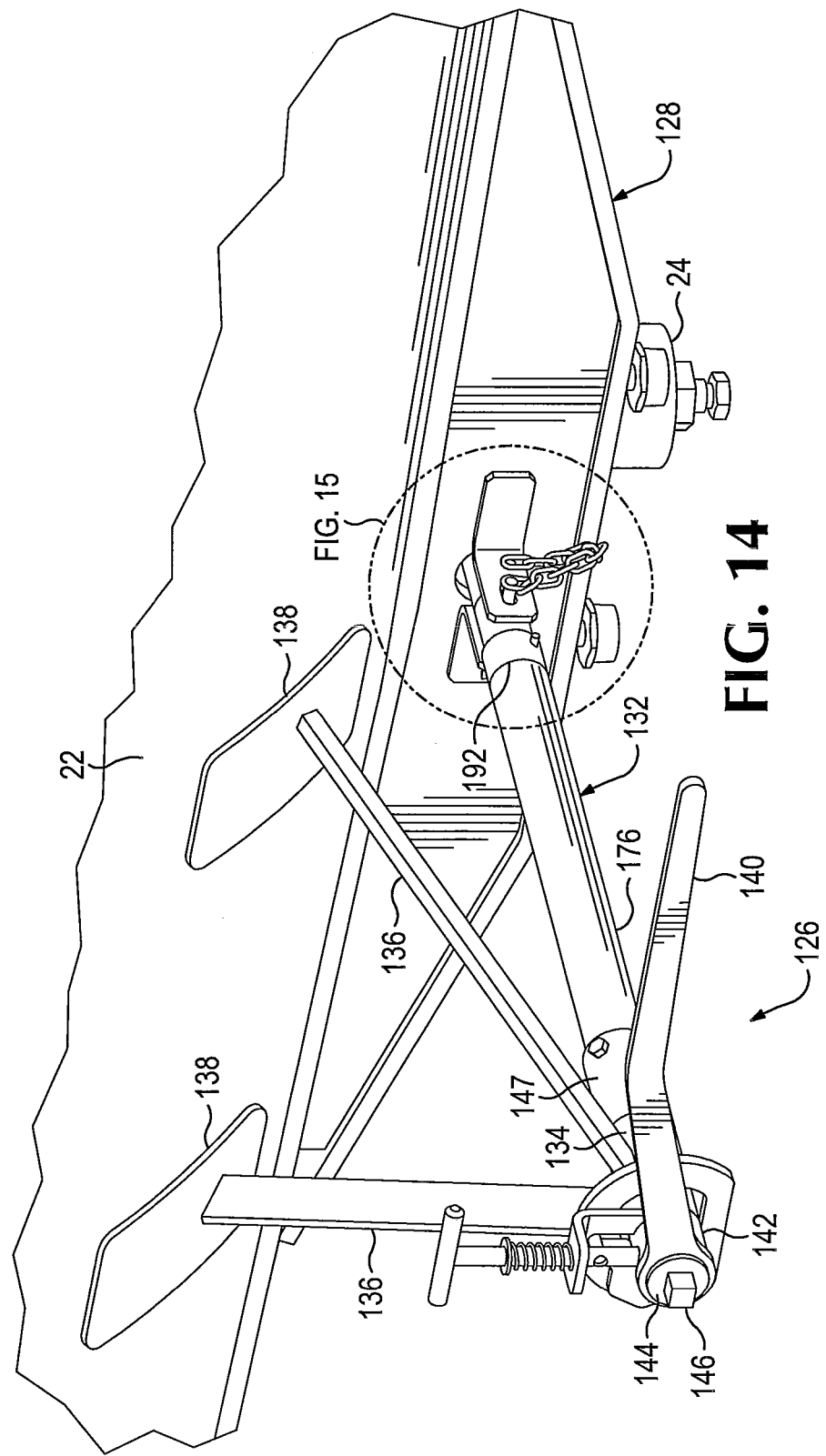

OPERATING MECHANISM FOR TANK CAR BOTTOM VALVE

BACKGROUND OF THE INVENTION

The present invention relates to railroad tank cars, and in particular, to an operating mechanism for a valve controlling release of liquid cargo from the bottom of a railroad tank car.

A bottom valve in a railroad tank car is used to drain liquid cargo from the car. Such a valve is located near the lowest point in the cargo tank, usually near the center of the length of the car, between the wheeled trucks that support the car on the rails. Such a valve is usually provided some protection, such as by a substantial structure at least partly surrounding the valve, in order to reduce the danger of release of liquid cargo should the car be derailed. Nevertheless, there has been some danger in the past that a bottom valve operating mechanism might open the bottom valve if a derailed car encounters the ground or other obstructions in such a way that the valve operating mechanism is affected.

SUMMARY OF THE INVENTION

An operating mechanism for a bottom valve of a railroad tank car as disclosed herein incorporates safeguards to require definite intentional action to open such a bottom valve. An operating lever for the bottom valve is connected to a valve operating shaft only when a connecting mechanism is engaged by moving a connecting element such as a drive pin against the opposing force of a spring to place it into a required position.

In one embodiment of such an operating mechanism, a spring's force must be overcome to move a connecting pin movable as a plunger that must be inserted into a receptacle in the valve operating shaft, as the spring normally urges the drive connecting pin out of a position of driving engagement with the valve operating shaft.

In one embodiment of the operating mechanism disclosed herein, such a spring forces the drive connecting pin out of engagement with the valve operating shaft when a valve operating lever is moved to a position in which the bottom valve is closed, and an element of the mechanism associated with the connecting pin is moved thereby into a gate which then prevents the valve operating lever from moving from the valve-closing position.

In one embodiment of the operating mechanism, the valve operating shaft assembly includes a coupling between two adjacent parts of the shaft, and the two adjacent parts are kept aligned with each other by a sleeve of material that can easily be bent or broken loose in the event of unusual bending force applied to the shaft. This would leave only a short portion of the shaft connected to the valve in the case of an accident that might otherwise bend the shaft and tend to rotate the shaft so as to open the bottom valve of a railroad tank car.

In another embodiment the operating shaft assembly includes a coupling that is ordinarily kept engaged by a pin that is weak enough to fail under a moderate bending stress or lateral force applied to the operating shaft assembly, thus disconnecting the coupling. The same coupling is easily disconnected by longitudinal displacement of an outer portion of the shaft assembly away from the bottom valve.

The foregoing and other objectives and features of the invention will be more readily understood upon consideration of the following detailed description of the invention taken in conjunction with the accompanying drawings.

BRIEF DESCRIPTION OF THE SEVERAL DRAWINGS

FIG. 2 is an isometric view of a portion of the tank car shown in FIG. 1 including the valve operating mechanism for a bottom valve, at an enlarged scale.

FIG. 14 is an isometric view similar to FIG. 2, showing a slightly different valve operating mechanism for a bottom valve of a tank car.

DETAILED DESCRIPTION OF PREFERRED EMBODIMENTS

Figure 1:
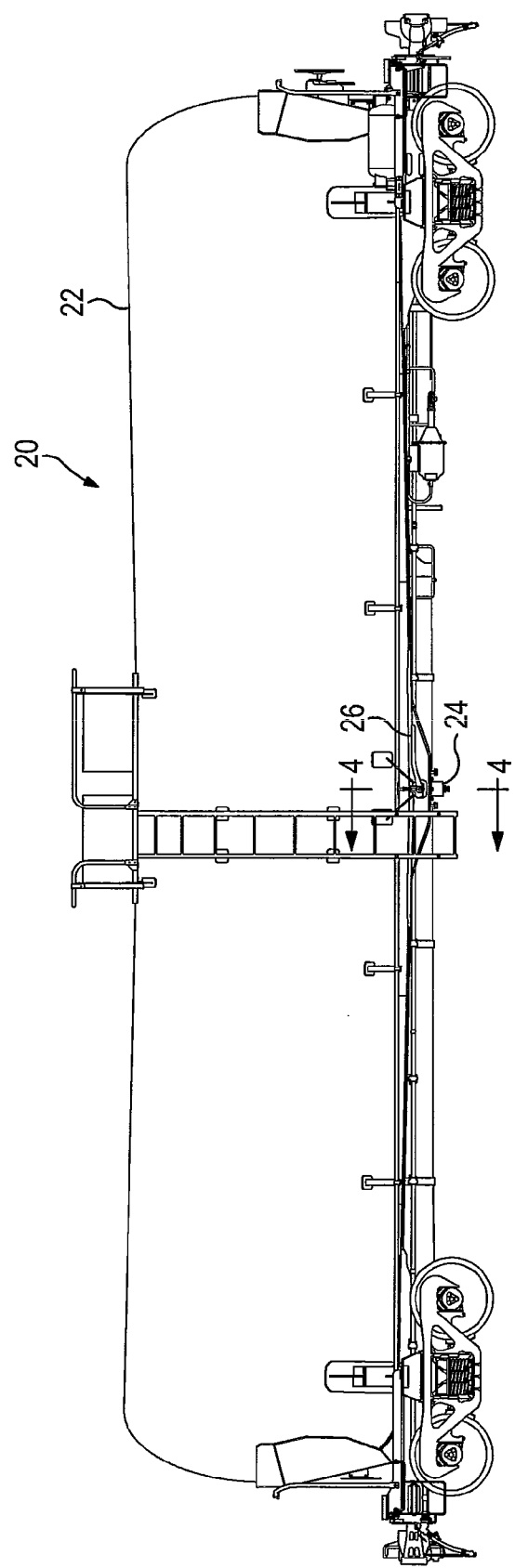
FIG. 1 is a side elevational view of a railroad tank car incorporating a valve operating mechanism for a tank car bottom valve as disclosed herein.

Referring now to the drawings which form a part of the disclosure herein, a railroad tank car 20 shown in FIG. 1 has a body that includes a cargo tank 22 having a bottom valve 24 centrally located along the length of the tank car. The bottom valve 24 is operable by a valve-operating mechanism 26 that extends laterally from the bottom valve 24 to a position spaced laterally outward from the centerline of the tank car in order to be conveniently operable in connection with unloading the car.

As shown in FIGS. 2, 2A, 3, 3A, and 4, the bottom valve 24 is protected by a surrounding protective structure 28 which may include a substantial wall of steel plate construction defining a hole 30 through which a valve operating shaft assembly 32 extends laterally outward from the centerline of the tank car. The valve operating shaft assembly 32 extends outwardly to a support bearing 34 which may be a sleeve surrounding the valve operating shaft 32 and may be supported by a pair of struts 36 welded to an upper part of the sleeve and extending diagonally upward to doubler plates 38 welded to the exterior of the cargo tank 22. A valve operating lever 40, or control handle, is shown in a bottom valve closing position in FIG. 2, where the valve operating lever 40 extends generally horizontally and to the right, as seen in FIGS. 2, 2A, 3, and 3A. The valve operating lever 40 is connected, as by welding, to an operating lever sleeve 42 which may be a short piece of thick-walled pipe snugly surrounding an outer end 44 of the valve operating shaft 32. The operating lever sleeve 42 may be attached to the valve-operating shaft and may be held closely adjacent to an outer end of the support bearing 34 by a washer 46 and a suitable fastener 47 extending through the washer and longitudinally into the outer end 44 of the valve operating shaft, so that the operating lever sleeve 42 and the valve operating lever 40 can be rotated about the outer end 44 of the valve operating shaft 32.

Figure 2A:
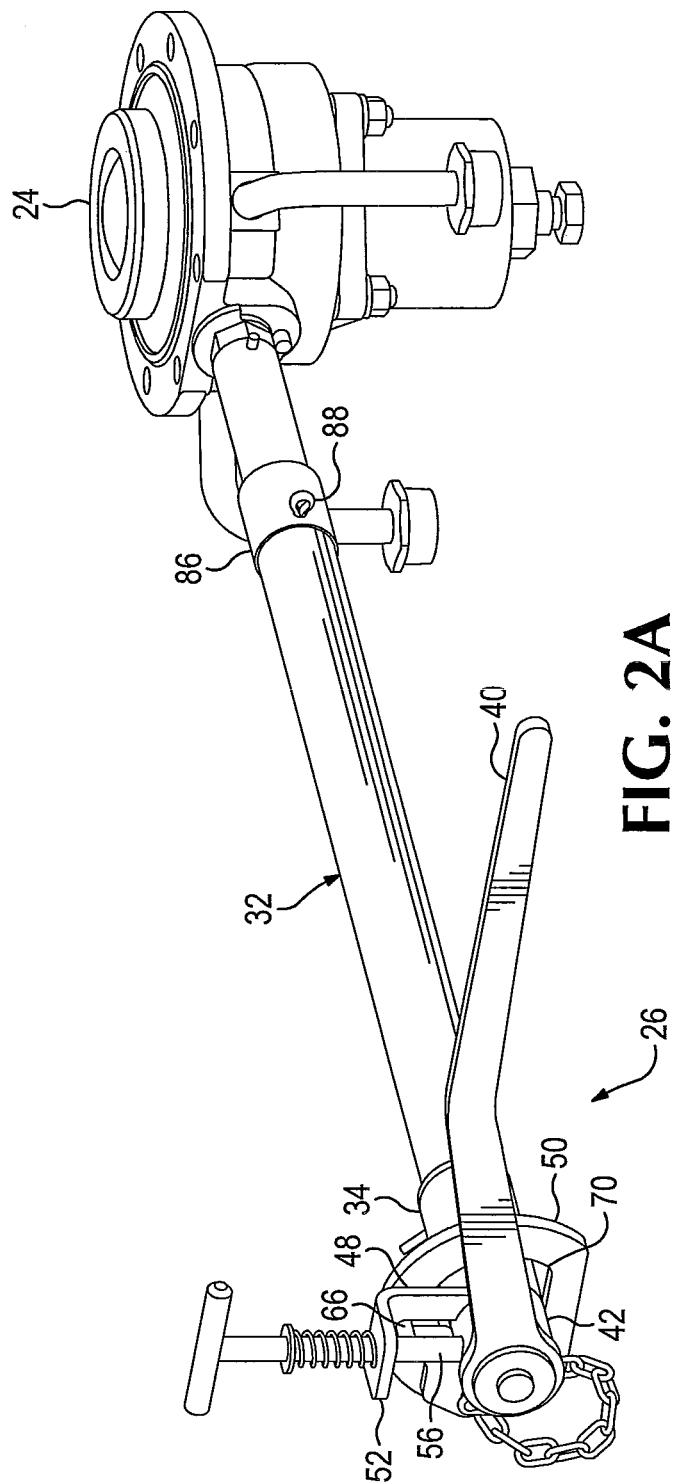
FIG. 2A is a perspective view of a prototype of part of the valve operating mechanism shown in FIG. 2.
Figure 3:
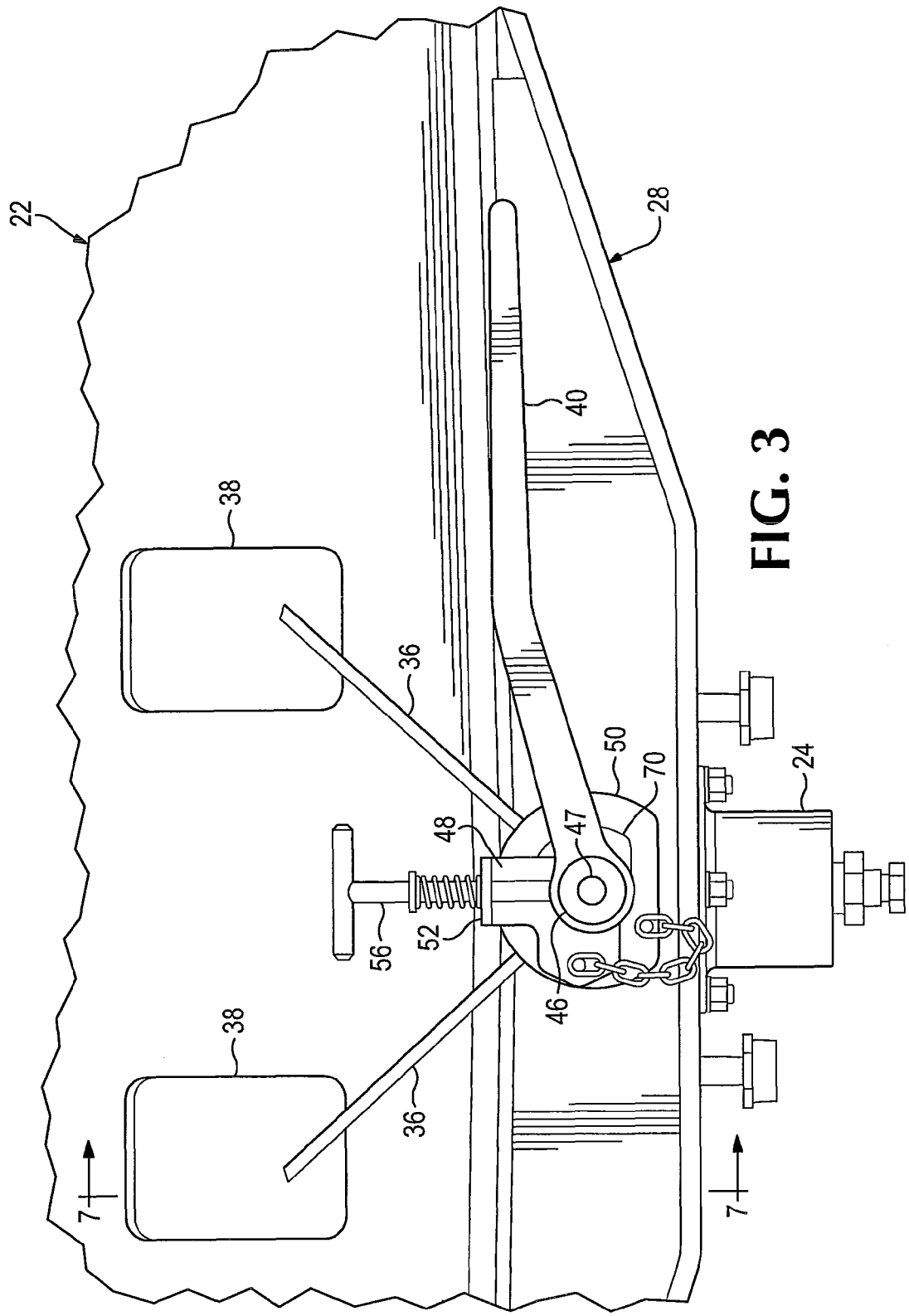
FIG. 3 is an elevational view of the valve operating mechanism shown in FIGS. 1 and 2, taken in the direction of FIG. 1, at a further enlarged scale.
Figure 3A:
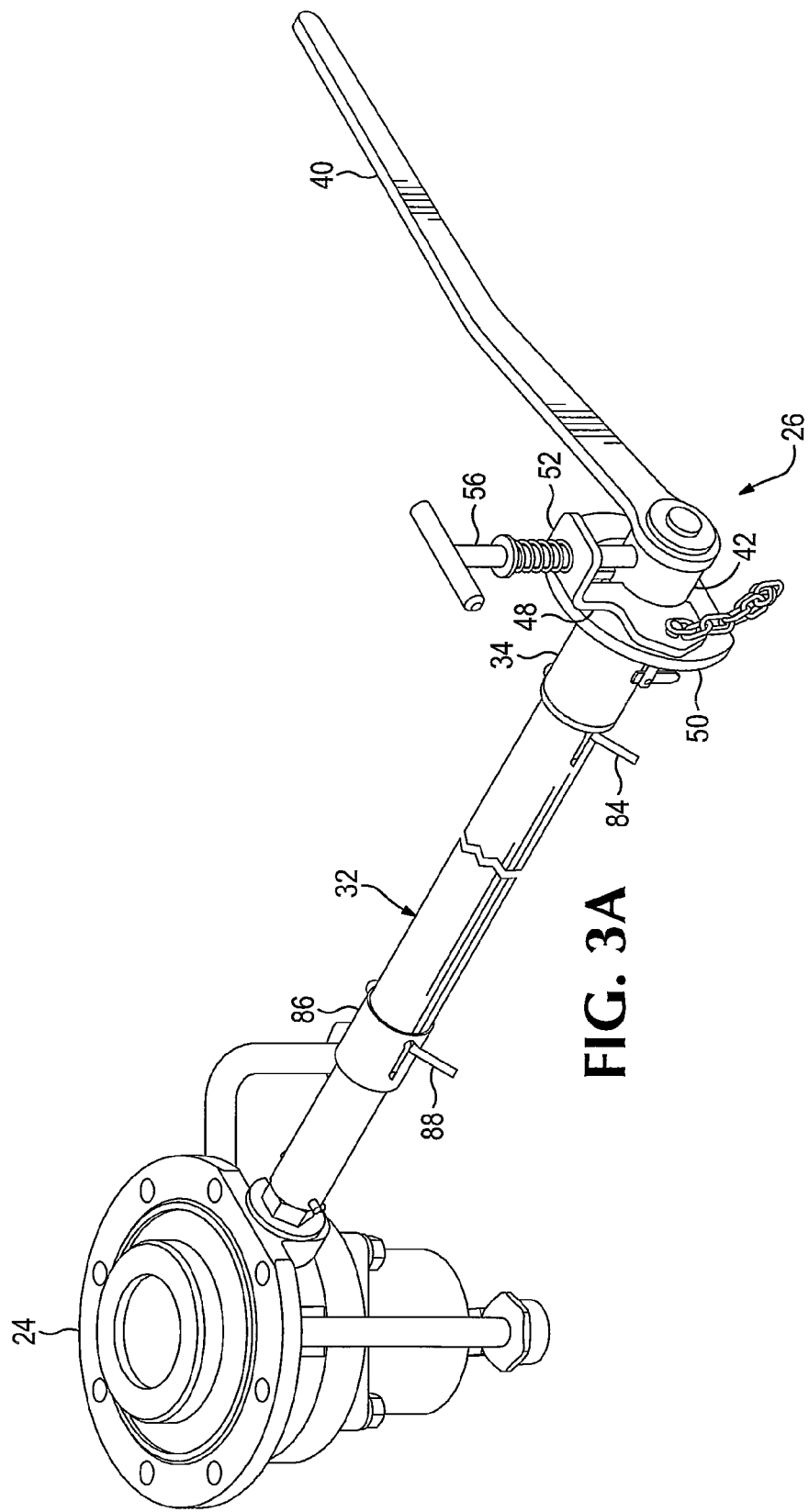
FIG. 3A is a perspective view of the prototype shown in FIG. 2A taken in a direction similar to that of FIG. 3.

Attached to and extending radially outward from the operating lever sleeve 42 and thus upwardly as depicted in FIG. 2, is a drive pin support member 48 which may be located closely alongside a control plate 50 fastened, as by welding, for example, to an outer end of the support bearing sleeve. The drive pin support member 48 extends radially outward from the support bearing sleeve 34. An outer end portion of the drive pin support member 48 extends away from the control plate 50, thus forming a flange 52 or shelf extending parallel with the length of the valve operating shaft, and thus horizontally as seen in FIG. 2 and FIG. 2A. The control plate 50 is located parallel with and closely alongside the radially extending portion of the drive pin support member 48.

A drive connection pin 56 has an inner end 58 engaged in and extending through a radially extending hole 60 in the operating lever sleeve 42. The drive pin 52 extends radially outwardly away from the operating lever sleeve 42 and through a hole 62 in the flange 52 of the drive pin support member 48. The drive pin 56 is thus supported so that it extends radially away from the operating lever sleeve 42 and parallel with the control plate 50. A spring 64, which may be a compression spring resting against the flange 52 of the drive pin support member 48, acts on the drive pin 56 to urge the drive pin away from the operating lever sleeve 42.

A control pin 66 attached to the drive pin 56 extends laterally away from the drive pin 56 through a slot 68 defined in the drive pin support member 48 and extending radially away from the operating lever sleeve 42, thus keeping the drive pin 56 from rotating in the hole 62 in the operating lever sleeve. The control pin 66 extends further away from the drive pin 56, beyond the drive pin support member 48, into a slot or channel 70 defined by the control plate 50. A short piece of bar stock may be attached to the radially outer end of the drive pin, forming a "T" handle 72 that may be used to urge the drive pin radially inward toward the operating lever sleeve, against the force of the spring 64.

Figure 4:
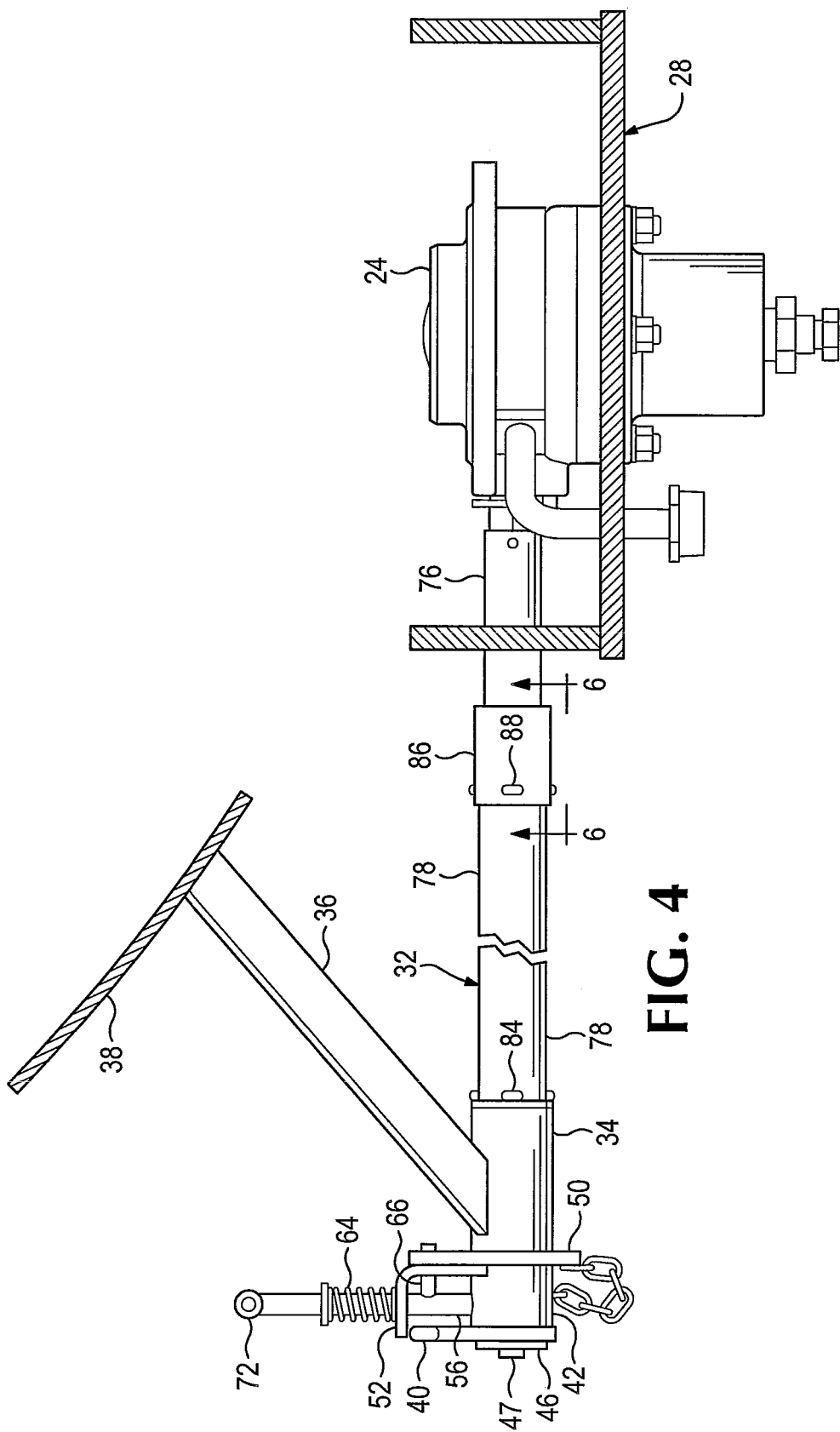
FIG. 4 is a sectional view of a detail of the tank car shown in FIG. 1, at an enlarged scale, taken in the direction of line 4-4 in FIG. 1.
Figure 5:
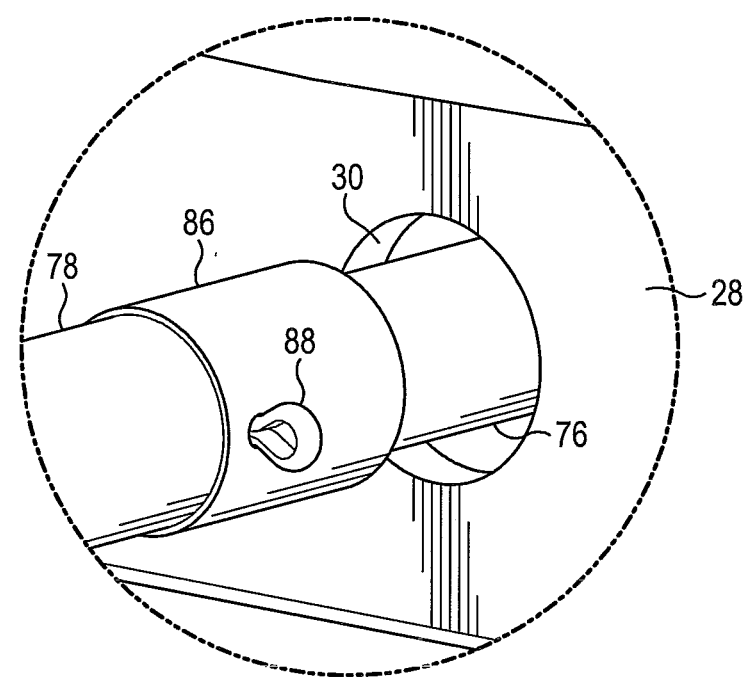
FIG. 5 is a detail view of a portion of the valve operating shaft included in the operating mechanism shown in FIG. 2, at an enlarged scale.
Figure 6:
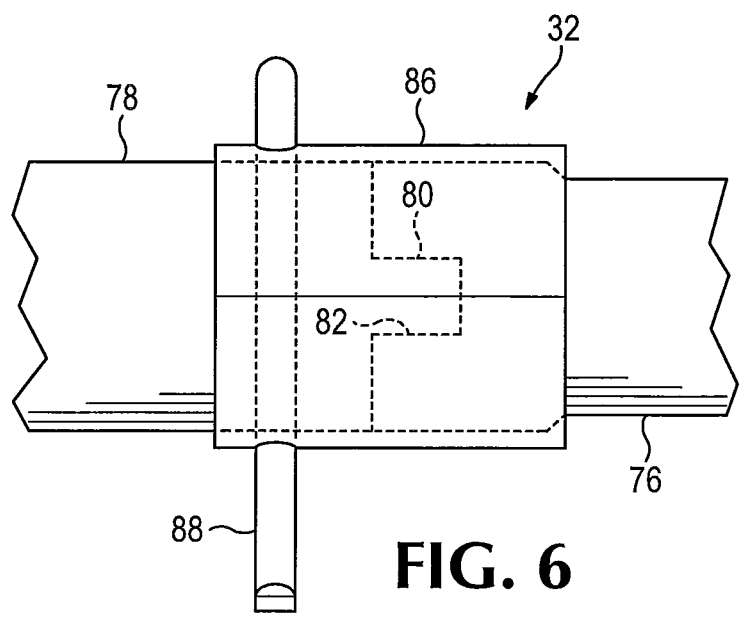
FIG. 6 is a bottom plan view of the linkage shown in FIG. 5.

As shown in FIGS. 4, 5, and 6, the valve operating shaft assembly 32 includes an inner part 76, extending through the hole 30 in the protective structure 28 surrounding the bottom valve 24, and an outer part 78 extending farther outward with respect to the car body and through the support bearing 34. The valve operating lever sleeve 42 is attached to the outer end of the outer part of the valve operating shaft, as described above. The inner and outer parts 76 and 78 of the valve operating shaft 32 may, for the most part, be of tubular steel, but solid connector parts may be welded to the adjacent ends of the inner part and outer part as shown best in FIG. 6, where a male driving member such as a lug 80 may be provided on the inner end of the outer operating shaft part 78, while a corresponding receptacle, such as a diametrically extending groove 82 may be defined in the solid end portion of the outer end of the inner part 76 of the valve operating shaft assembly 32. Thus, with the adjacent ends of the inner and outer parts 76 and 78 of the shaft assembly 32 aligned with each other, rotation of the outer part 78 of the valve operating shaft assembly 32 will rotate the inner part 76 to operate the bottom valve 24.

Ordinarily, a retaining fastener such as a cotter pin 84 extends through the outer part 78 of the valve operating shaft and alongside a washer that is adjacent to the inner end of the support bearing 34, to keep the outer part 78 from moving longitudinally within the support bearing 34, away from the inner part 76. With the support bearing 34 and the struts 36 which support it intact, the two adjacent parts 76 and 78 of the shaft assembly 32 are thus held drivingly interconnected with each other. For somewhat greater security, however, a retainer or linkage sleeve 86 is provided, surrounding the interlocked connector parts 80 and 82 at the adjacent ends of the two parts 76, 78 of the valve operating shaft 32. Since normally there is little, if any, force likely to urge the two parts 76 and 78 of the shaft out of alignment and engagement with each other the linkage sleeve 86 may be of light and easily bent sheet metal, for example 11 gauge to 14 gauge sheet steel, bent to form a cylinder surrounding the interconnected ends 80 and 82 of the two parts 76 and 78 of the valve operating shaft 32 and held in place by, for example, a cotter pin 88 extending through one, but not both of the interconnected valve operating shaft parts. The linkage sleeve 86 ensures integrity of the shaft assembly 32 to operate the bottom valve 24 under normal conditions. Should the tank car be derailed, however, in such a way that the support bearing 34 is displaced, applying a bending moment to the valve operating shaft assembly 32, the linkage sleeve 86 would easily be deformed and displaced, allowing the outer part 78 of the valve operating shaft to easily become separated from the outer end of the inner portion 76 of the valve operating shaft 32, so that there will thereafter be practically no forces acting on the inner portion 76 of the valve operating shaft that might open the bottom valve 24 of the tank 22.

Figure 9:
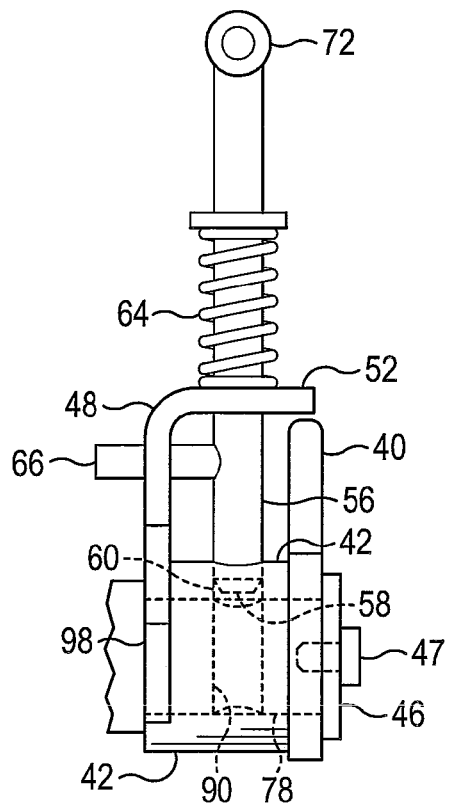
FIG. 9 is a detail view, at an enlarged scale, showing the relationship between a drive connecting pin and the valve operating shaft of the valve operating mechanism.
Figure 9A:
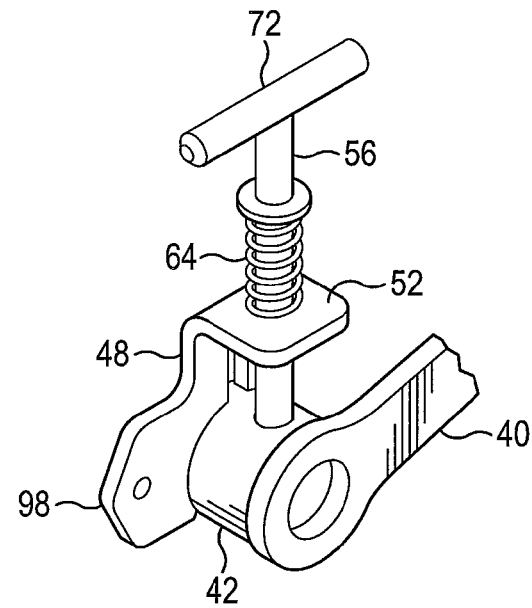
FIG. 9A is a perspective view of the valve operating lever, the operating lever sleeve, and the drive connecting pin shown in FIG. 9.
Figure 9B:
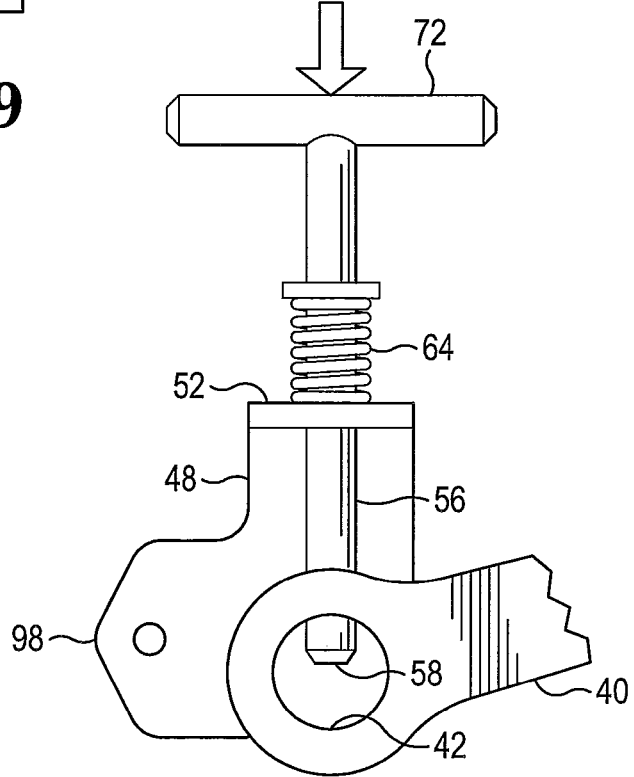
FIG. 9B is a perspective view of the valve operating lever and sleeve shown in FIG. 9A with the drive connecting pin moved extend into the interior of the operating lever sleeve.
Figure 10:
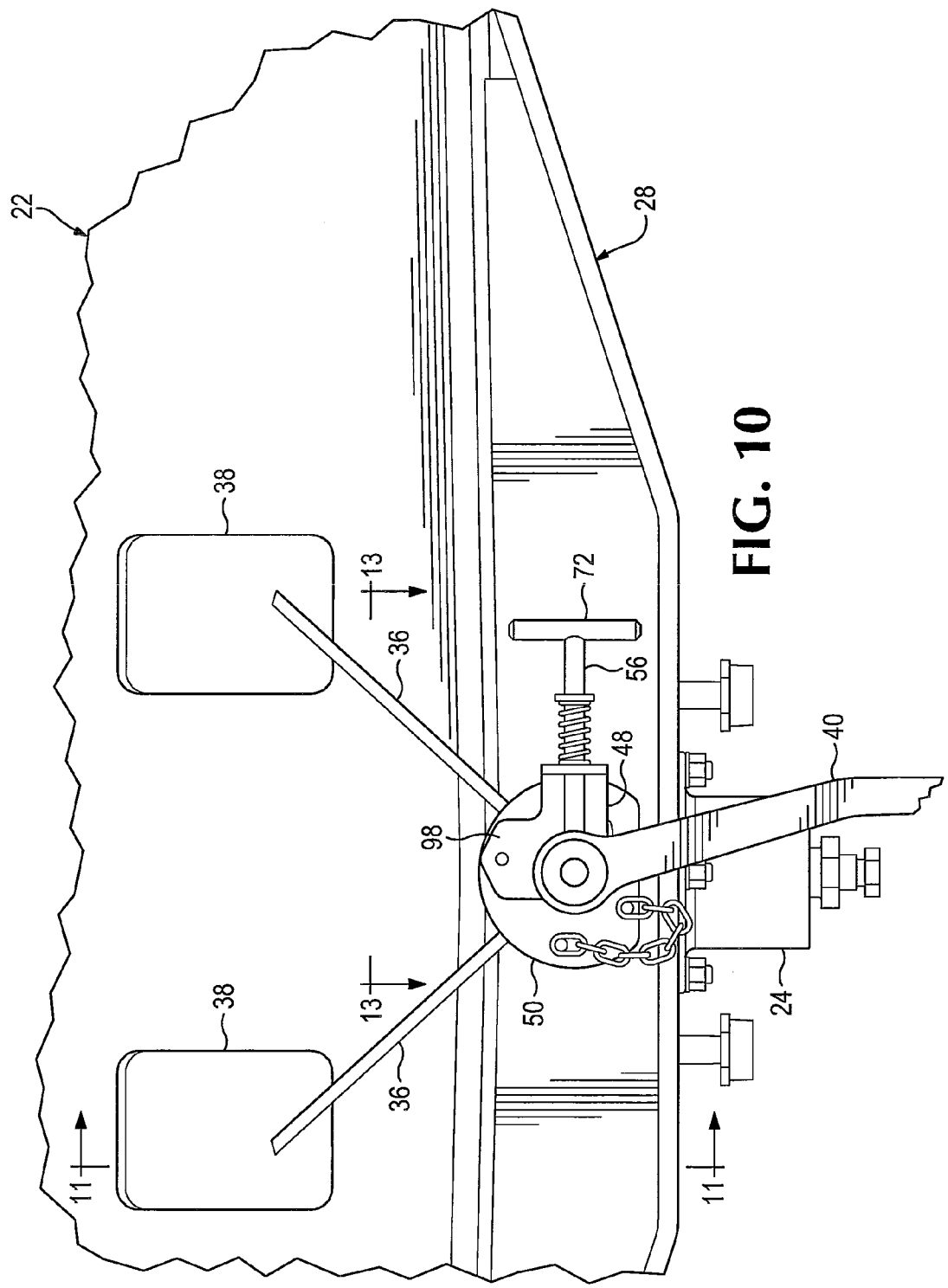
FIG. 10 is a view similar to FIG. 3 showing the valve operating mechanism engaged and the valve operating lever moved to place the bottom valve in an open position.
Figure 11:
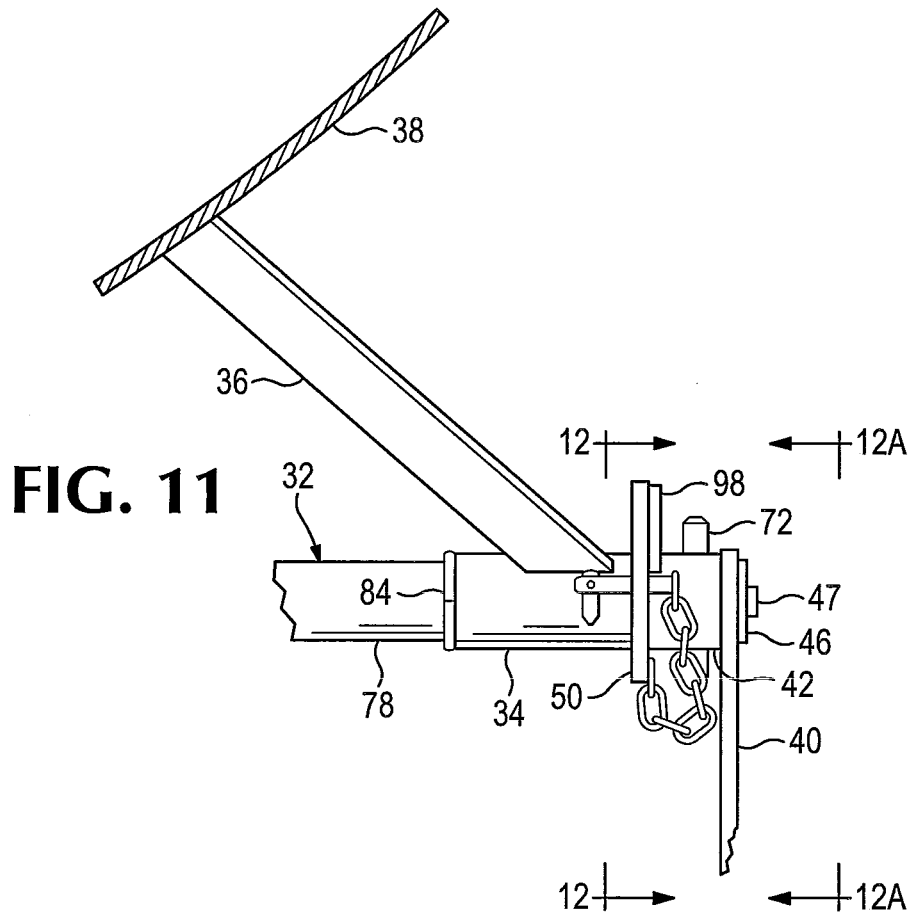
FIG. 11 is a view similar to FIG. 7, with the valve operating mechanism in the position shown in FIG. 10.
Figure 12:
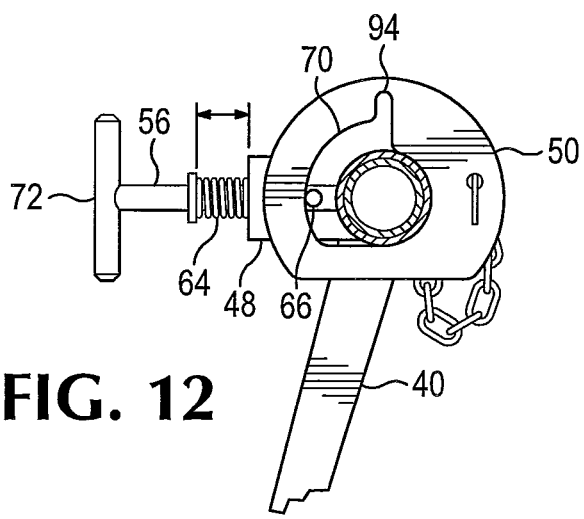
FIG. 12 is a view of a portion of the valve operating mechanism, taken along line 12-12 in FIG. 11.
Figure 13:
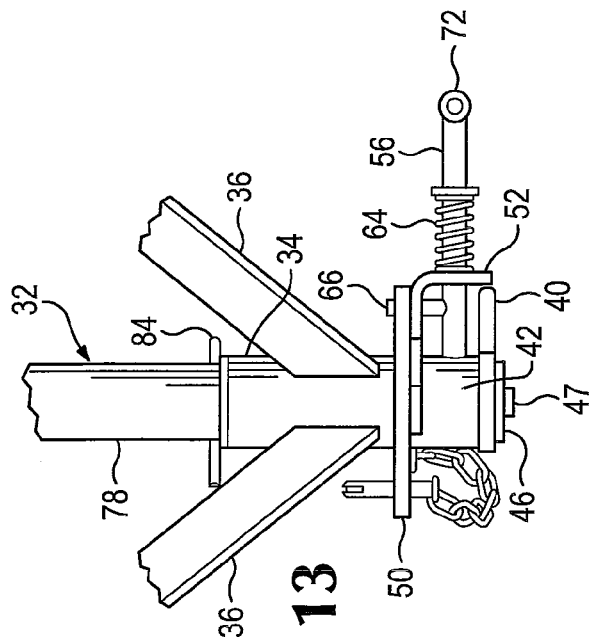
FIG. 13 is a sectional view taken along line 13-13 in FIG. 10 of a portion of the valve operating mechanism with the valve operating mechanism in the position shown in FIG. 10.
Figure 12A:
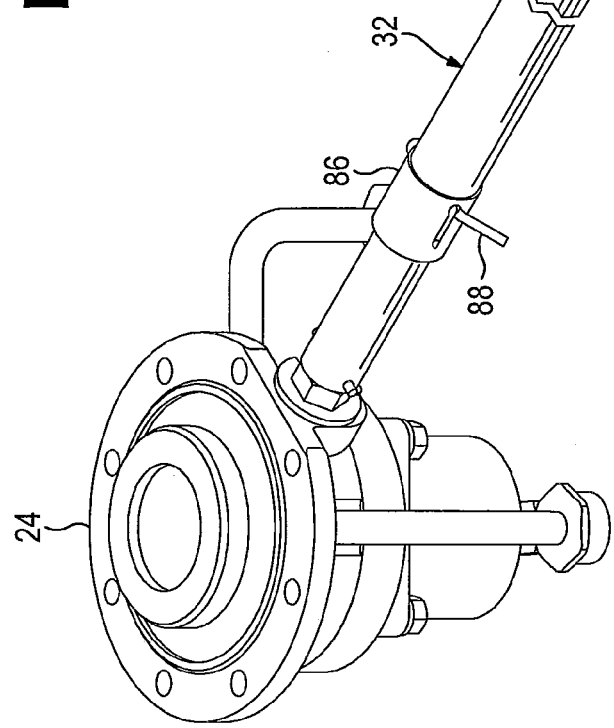
FIG. 12A is a photograph of a portion of the prototype showing a portion of the valve operating mechanism illustrated in FIG. 11 and FIG. 12, taken in the direction of line 12A-12A in FIG. 11.
Figure 15:
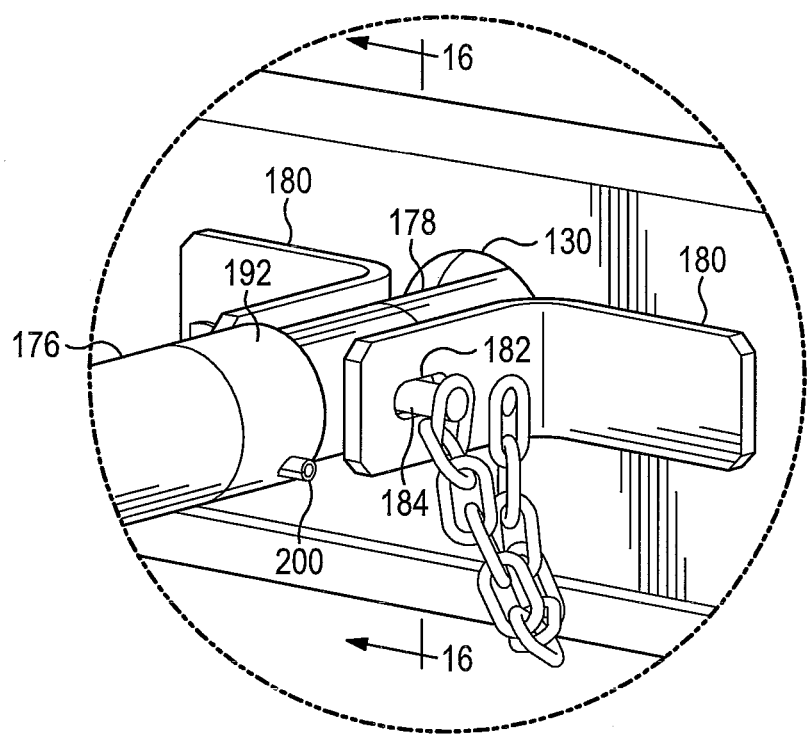
FIG. 15 is an isometric view, at an enlarged scale, of a portion of the valve operating mechanism shown in FIG. 14.
Figure 16:
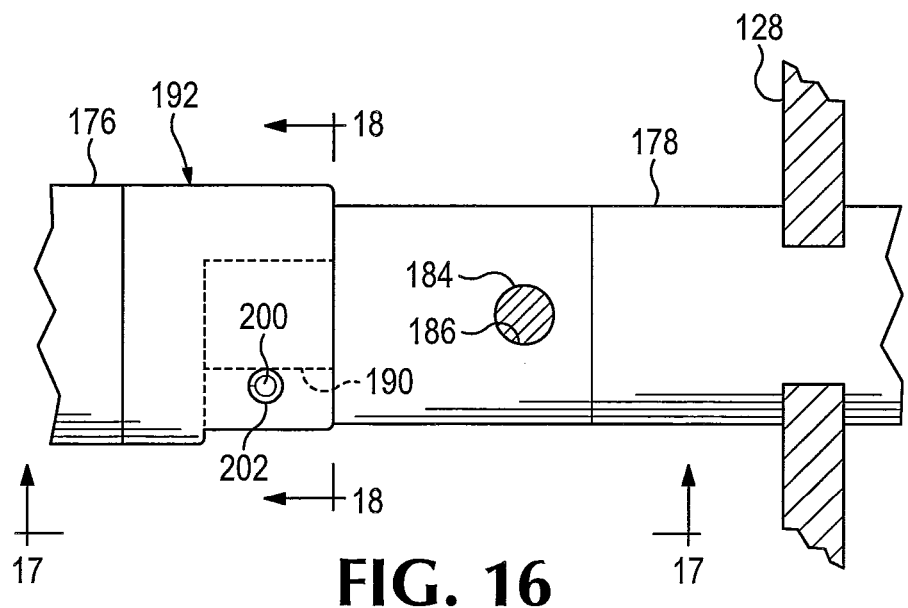
FIG. 16 is an elevational view of the portion of the valve operating mechanism shown in FIG. 14, taken in the lateral direction indicated by the line 16-16 in FIG. 15.
Figure 17:
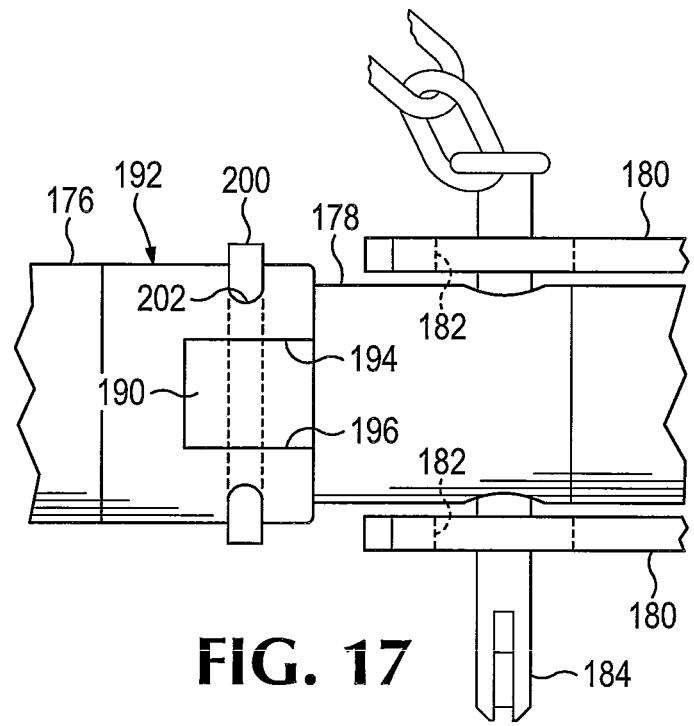
FIG. 17 is a bottom plan view of the portion of a valve operating mechanism shown in FIGS. 15 and 16.
Figure 18:
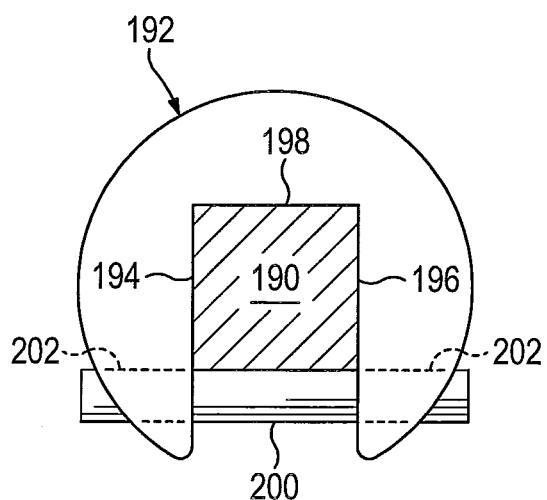
FIG. 18 is a sectional view, taken along line 18-18 in FIG. 16.

As shown best in FIG. 9, a transverse bore 90 extends through a solid bar outer end portion 44 of the valve operating shaft outer part 78, on which the operating lever sleeve 42 is located. Moving the drive pin 56 downwardly as viewed in FIG. 9 moves the inner end 58 of the drive pin 56 into engagement in the transverse bore 90, which acts thus as a receptacle for the inner end 58 of the drive pin. This movement of the drive pin compresses the spring 64 and also moves the control pin 66 radially inward, toward the support bearing 34, and out of a gate 94 and into the slot or channel 70 defined by the control plate 50, to permit the valve operating lever 40 to be rotated to open the bottom valve 24. Once the valve operating lever 40 has been rotated the control pin 66 can ride against the inner surface of the slot or channel 70 defined by the control plate 50, as the valve operating lever is pivoted downward, rotating the shaft assembly 32, to fully open the bottom valve 24. The operating lever sleeve 42 carries the drive pin support member 48, the drive pin 56, and the control pin 66 along in rotation relative to the control plate 50 and the support bearing 34, thus turning the entire valve operating shaft assembly 32. The extreme positions of the drive pin 56 relative to the operating lever sleeve 42 may be seen in FIGS. 9A and 9B. Thus, as may be seen in FIGS. 10 and 13, with the bottom valve 24 fully open the drive pin 56 and drive pin support member 48 extend horizontally to the right, the inner end 58 of the drive pin is engaged in the bore 90 in the outer end part 44 of the valve operating shaft 32, and the valve operating lever 40 extends downward.

Figure 7:
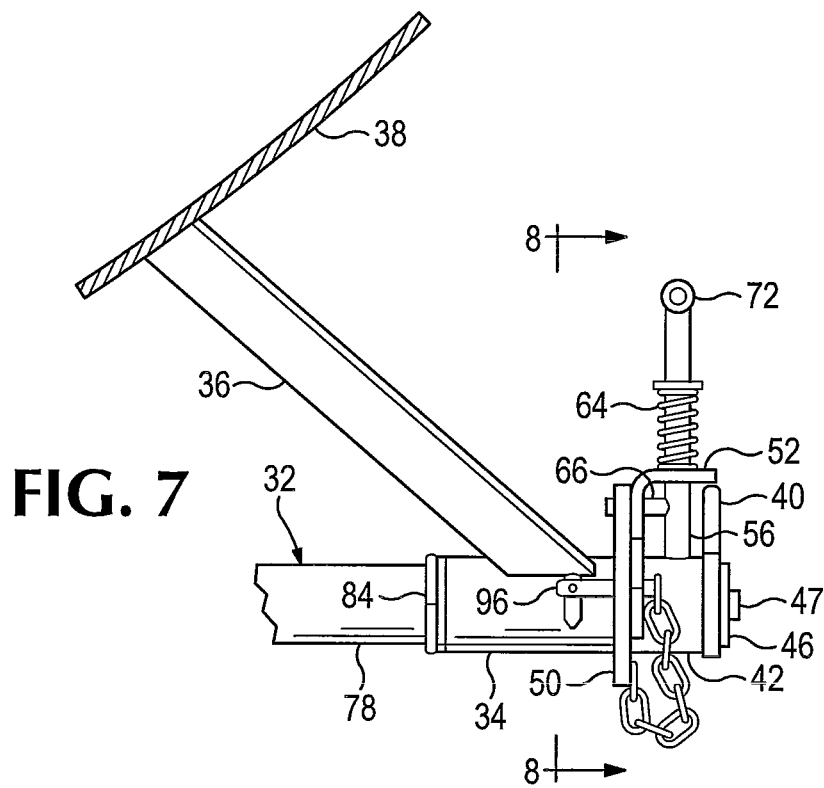
FIG. 7 is an elevational view of part of the valve operating mechanism shown in FIG. 4, taken from the opposite side thereof.
Figure 8:
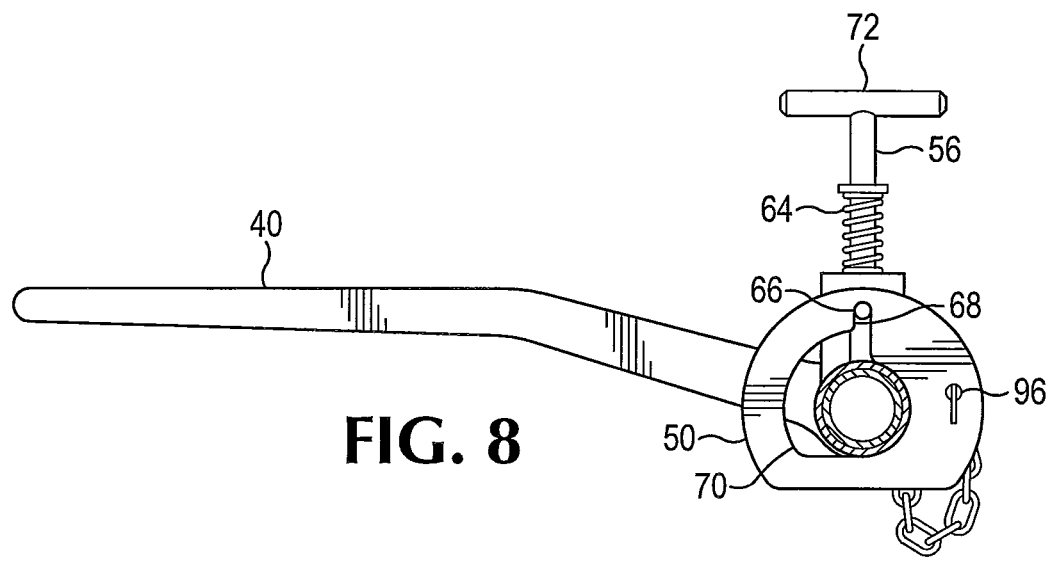
FIG. 8 is a view of a portion of the valve operating mechanism, taken along line 8-8 in FIG. 7.
Figure 8A:
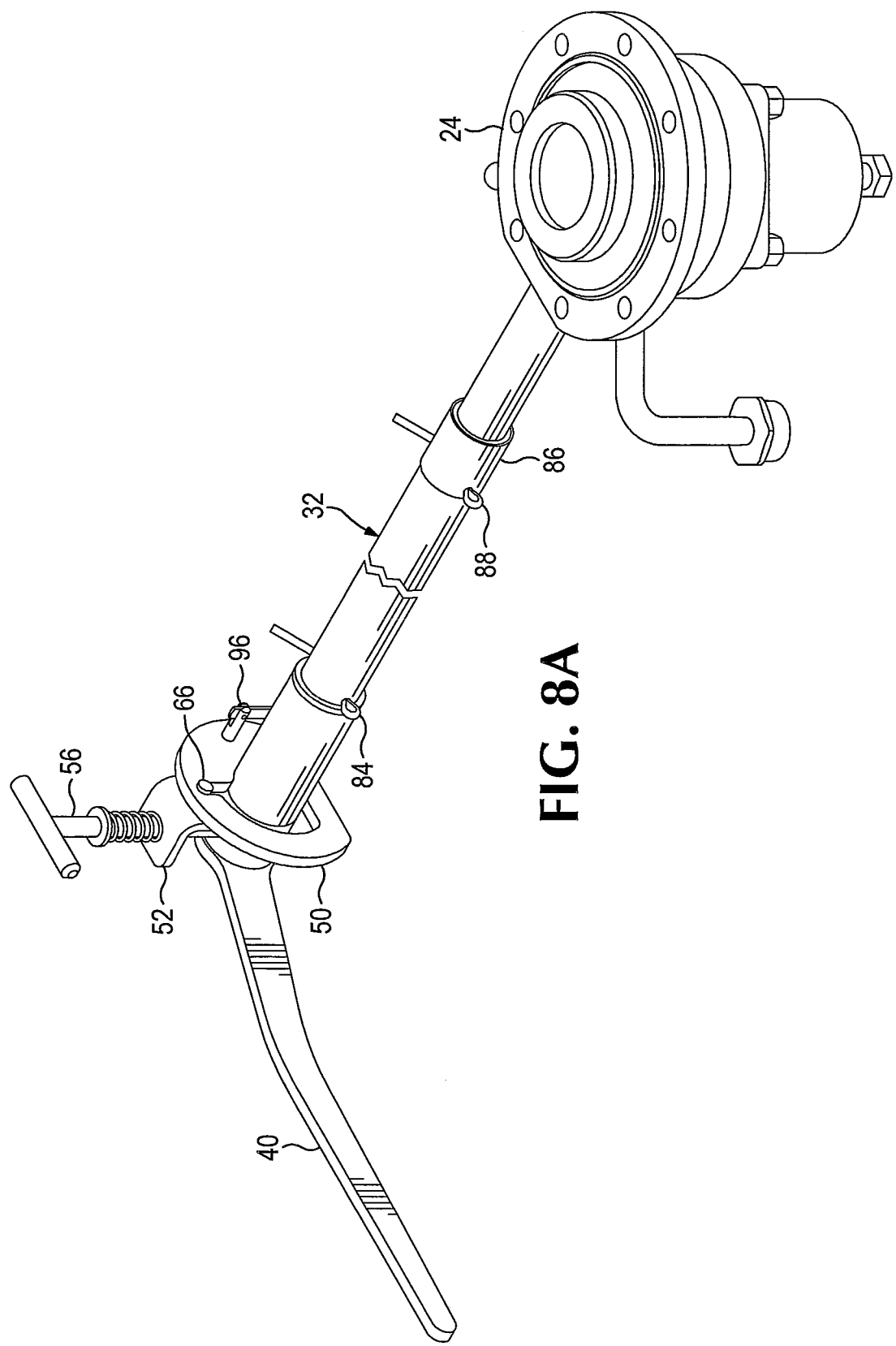
FIG. 8A is a perspective view of the prototype including the portion of the valve operating mechanism shown in FIG. 8.

When the valve operating lever 40 is returned upward to its horizontally extending position to close the bottom valve 24, so long as no one intentionally holds the drive pin 56 radially inward, or downward as shown in FIGS. 2, 7, and 8, the spring 64 will push the drive pin 56 radially outward, or upward as shown in FIGS. 2, 7, and 8, thus disengaging the valve operating handle from driving connection to the valve operating shaft 32 and moving the control pin 66 back into the gate 94 to retain the valve operating lever 40. As shown, for example in FIGS. 7 and 8, a locking pin 96 and associated seal may also be used to interconnect an arm 98, extending from the drive pin support member, to the control plate 50 to prevent movement of the valve control lever 40 with respect to the control plate to discourage and give evidence of tampering with the valve operating mechanism.

As shown in FIGS. 14-18, a slightly different valve operating mechanism 126 is associated with the cargo tank 22 to operate the bottom valve 24. The bottom valve 24 is protected by a surrounding protective structure 128 which may include a substantial wall of steel plate construction defining a hole 130 through which a valve operating shaft assembly 132 extends laterally outward from the centerline of the tank car. The valve operating shaft assembly 132 extends outwardly to a support bearing 134 which may be a sleeve surrounding the valve operating shaft 32 and which may be supported by a pair of struts 136 welded to an upper part of the sleeve and extending diagonally upward to doubler plates 138 welded to the exterior of the cargo tank 22. A valve operating lever 140, or control handle, is shown in FIG. 14 in a position in which the bottom valve 24 is closed and the operating lever 140 extends generally horizontally and to the right as seen in FIG. 14. As in the valve operating mechanism 26 shown in FIGS. 2, 2A, 3, and 3A, the valve operating lever 140 is connected, as by welding, to an operating lever sleeve 142 which may be a short piece of thick-walled pipe snugly surrounding an outer end of the valve operating shaft 132. The operating lever sleeve 142 is attached to the valve-operating shaft 132, and may be held closely adjacent to an outer end of the support bearing 134, by a washer 144 that may be welded to the outer end of the shaft. A lug 146 extends from the outer end of the valve operating shaft 132. Preferably, the lug 146 has a uniformly acceptable or prescribed size, such as being a one-inch square head that can be engaged by a readily available wrench to rotate the valve operating shaft 132 in a situation in which the operating lever 140 has been rendered inoperative. A sleeve 147 may be fitted around the valve operating shaft 132 adjacent the support bearing 134 and may be fastened to the shaft by, for example, a bolt extending through the sleeve 147 and the shaft, so that the sleeve, acting against the support bearing 134, keeps the shaft from moving laterally outwardly away from the bottom valve 24.

An arrangement similar to that described above with respect to the interconnection of the valve operating lever 40 with the valve operating shaft 32 may be provided for normal use of the valve operating lever 140 to operate the bottom valve 24. As shown in FIGS. 15-18, however, at the inner end of the outer operating shaft 178 an arrangement different from that disclosed above in connection with the valve operating shaft assembly 32 is provided to connect the outer operating shaft 178 with the inner operating shaft part 176 that operates the valve 24.

A pair of brackets 180 are mounted on the protective structure 128 on either side of the hole 130 with an arm of each bracket extending outward alongside the inner part 178 of the shaft assembly 132. A slot 182 is provided in each of the outwardly extending arms, and a toggle pin 184 extends through the slots 182 and through a hole 186 extending through the inner shaft part 178, so that when the toggle pin is in place the valve operating shaft assembly is prevented from rotating and thus prevented from operating the valve 24.

The outer end of the inner part 178 of the shaft assembly is provided with a square lug 190, which may be of a standardized size such as a one-inch square extending from the laterally outer end of the inner part 178 so that it can be used to rotate the shaft and thus operate the valve 24. A drive socket 192 may be provided on the inner end of the outer shaft part 176 of the valve operating shaft assembly 132, to receive the drive lug 190 so that rotation of the outer part 176 of the valve operating shaft assembly 132 will rotate the inner shaft part 178.

The drive socket 192 may have a pair of opposite side members 194 and 196 and a connecting member 198, together forming a three-sided, or "inverted U"-shaped, receptacle for the drive lug 190. A fourth side of the receptacle is open, but may be closed by a pin such as a roll pin 200 fitted in coaxial bores 202 in the side members 194 and 196, to keep the drive socket 192 mated with the drive lug 190 with respect to movement in a radial direction. The pin should be strong enough to keep the drive socket 192 aligned with the drive lug 190, but weak enough to fail in the case of the car 20 being involved in an incident that damages the supporting parts of the valve operating shaft assembly 132 such as the struts 136. As may be seen in FIGS. 14 and 15, with the operating lever 140 horizontal and the valve 24 closed and kept closed by the toggle pin 182 the roll pin 200 is at the bottom of the valve operating shaft assembly 132.

Should the tank car 20 be involved in an incident in which the valve operating mechanism 126 is seriously deformed, the outer part 176 of the valve operating shaft assembly 132 is likely to be separated from the inner part 178. This may occur either by the drive socket 192 sliding longitudinally with respect to the valve operating shaft assembly 132, laterally with respect to the car 20, apart from the inner part 178. Alternatively it might occur as a result of bending or detachment of the struts 136 and associated displacement of the outer part 176 of the valve operating shaft assembly 132, and resulting bending forces which may thus result in the roll pin 200 being sheared, allowing the drive socket 192 to separate from the drive lug 190. Separation would, in either case, leave the drive lug 190 available to be engaged by a wrench to operate the valve 24.

The terms and expressions that have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In combination with a railroad tank car body having a centerline and including a manually operated bottom valve, a manual valve operating mechanism comprising:
    (a) a valve operating shaft separate from the bottom valve and extending laterally outward and away from the centerline of the tank car body and away from the bottom valve, outside the tank car body, and having an outer end;
    (b) a support bearing supported by the car body, the support bearing supporting said outer end of the valve operating shaft;
    (c) a valve operating lever mounted adjacent the support bearing, on a sleeve that surrounds the valve operating shaft and that is coaxial with a central longitudinal axis of the valve operating shaft;
    (d) a normally-disengaged drive mechanism, associated with the valve operating lever and requiring manual engagement with the valve operating shaft to connect the valve operating lever selectively to the valve operating shaft, in such a way that movement of the valve operating lever is effective to rotate the valve operating shaft.

2. The manual valve operating mechanism of claim 1, wherein the normally-disengaged drive mechanism includes a drive pin that is carried on the sleeve and movable radially with respect to the central longitudinal axis of the valve operating shaft, and wherein the valve operating shaft includes a receptacle into which an end of the drive pin can be drivingly engaged.

3. The valve operating mechanism of claim 2 further including a control pin mounted on the drive pin and a control plate associated with the support bearing, the control plate defining a gate in which the control pin is located when the drive pin is not engaged in the receptacle, presence of the control pin in the gate preventing movement of the valve operating lever.

4. The manual valve operating mechanism of claim 1 wherein the valve operating shaft includes an inner part located adjacent the bottom valve and an outer part spaced apart from the bottom valve, the inner part and the outer part being arranged in an end-to-end alignment and interconnected drivingly with one another by a connector including a drive lug on one of the inner part and the outer part and a socket in which the drive lug is received on the other one of the inner part and the outer part, the connector including a sheet metal sleeve fastened to one of the inner part and the outer part and that surrounds the drive lug and the socket and is strong enough to keep the inner part and outer part aligned with each other under normal conditions, but that is weaker than either of the inner part and the outer part and weak enough to fail in the case of the car being involved in an incident that damages a part of the car body supporting the valve operating shaft, so that the sheet metal sleeve can be deformed or displaced, thereby allowing movement of the outer part of the drive shaft out of alignment with the inner part thereof.

5. The manual valve operating mechanism of claim 1 wherein the valve operating shaft includes an inner part located closer to the bottom valve and an outer part located farther from the bottom valve, the inner part and the outer part being arranged in an end-to-end alignment and interconnected drivingly with one another by a connector including a drive lug on one of the inner part and the outer part and a drive socket on the other one of the inner part and the outer part, and wherein the drive lug is received in the drive socket, and wherein the connector may be disconnected by movement of the outer part of the valve operating shaft longitudinally away from the inner part thereof.

6. The manual valve operating mechanism of claim 5 wherein the drive socket includes a U-shaped receptacle having a pair of opposed sides and a connecting member extending between the opposed sides, each one of the pair of opposed sides defining a respective one of a pair of coaxial bores, and wherein a pin extends through the coaxial bores and alongside the drive lug so as to keep the drive lug in the drive socket.

7. In combination with a railroad tank car body including a bottom valve, a valve operating mechanism comprising:
    (a) a valve operating shaft extending from the bottom valve and having an outer end;
    (b) a support bearing supported by the car body, the support bearing supporting said outer end of the valve operating shaft;
    (c) a valve operating lever supported adjacent the support bearing and associated with the valve operating shaft, the valve operating lever being mounted on a sleeve surrounding the valve operating shaft;
    (d) a normally-disengaged drive mechanism associated with the valve operating lever and arranged to connect the valve operating lever selectively to the valve operating shaft, thereby enabling the valve operating lever to rotate the valve operating shaft, the normally-disengaged drive mechanism including a drive pin movable radially with respect to the sleeve, and the valve operating shaft including a receptacle into which an end of the drive pin can be engaged; and
    (e) a drive pin support assembly, the drive pin support assembly having associated therewith a spring arranged to urge the drive pin out of engagement in the receptacle.

8. The valve operating mechanism of claim 7 including a control pin extending from the drive pin and including a control plate associated with the support bearing, the control plate defining a lever-locking receptacle for the control pin and a guide slot located so as to keep the drive pin engaged drivingly in the receptacle of the valve operating shaft, so that movement of the valve operating lever can rotate the valve operating shaft.

\* \* \* \* \*